United States Patent [19]

Nakagawa et al.

[11] Patent Number: 4,983,023
[45] Date of Patent: Jan. 8, 1991

[54] LIQUID CRYSTAL DISPLAY PANEL WITH POLYMER SPACERS CONTAINING A PERCENTAGE OF EPOXY GROUPS

[75] Inventors: Kenichi Nakagawa, Nara; Takeshi Kitazawa, Nishinomiya; Takashi Kitamura, Yamaguchi, all of Japan

[73] Assignees: Sharp Kabushiki Kaisha; Kitazawa Yakuhin Co., Ltd., both of Osaka; Tosoh Corporation, Yamaguchi, all of Japan

[21] Appl. No.: 254,036

[22] Filed: Oct. 6, 1988

[30] Foreign Application Priority Data

Oct. 7, 1987 [JP] Japan .................. 62-255252

[51] Int. Cl.⁵ .......................... G02F 1/133
[52] U.S. Cl. ............................... 350/344
[58] Field of Search ............ 350/339 R, 344; 523/414

[56] References Cited

U.S. PATENT DOCUMENTS

| | | | |
|---|---|---|---|
| 4,297,401 | 10/1981 | Chern et al. | 350/343 |
| 4,362,771 | 12/1982 | Umeda et al. | 350/344 |
| 4,390,245 | 6/1983 | Shimizu et al. | 350/343 |
| 4,401,537 | 8/1983 | Chern et al. | 350/343 |
| 4,482,659 | 11/1984 | Sanjana et al. | 523/414 |
| 4,588,617 | 5/1986 | Oka | 350/344 |
| 4,740,060 | 4/1988 | Komura et al. | 350/344 |

FOREIGN PATENT DOCUMENTS

| | | |
|---|---|---|
| 0050357 | 4/1982 | European Pat. Off. . |
| 0216632 | 4/1987 | European Pat. Off. . |
| 1083520 | 4/1986 | Japan .................. 350/344 |

*Primary Examiner*—Stanley D. Miller
*Assistant Examiner*—Anita Pellman Gross
*Attorney, Agent, or Firm*—Birch, Stewart, Kolasch & Birch

[57] ABSTRACT

A liquid crystal display panel comprises at least two base plates spaced by a sealant on the peripheral portion of the plates and liquid crystal in the space between the base plates. The liquid crystal contains a spacer of rigid particles and polymer particles having 10 to 30% by weight of an epoxy group.

9 Claims, 1 Drawing Sheet

LIQUID CRYSTAL DISPLAY PANEL WITH POLYMER SPACERS CONTAINING A PERCENTAGE OF EPOXY GROUPS

FIELD OF THE INVENTION

The present invention relates to a liquid crystal display panel.

BACKGROUND OF THE INVENTION

A liquid crystal display panel is generally composed of two base plates spaced at a constant distance and liquid crystal sealed in the space between the base plates. The distance of the space is generally referred to as "cell thickness".

In order to obtain a high quality liquid crystal display panel, a uniform cell thickness is primarily required. The uniform cell thickness is usually realized by the following methods:

(1) The base plate is changed to a hard and thick one having a thickness of 3 to 5 mm.
(2) An inside pressure of the liquid crystal display panel is lower than the outside pressure, i.e., atmospheric pressure.

In the method (1), the display panel is heavy, and a displayed image and a shadow thereof result in a double image. In the method (2), if the volume of the liquid crystal is reduced at a low temperature, the inside pressure is further lower and finally it develops bubbles having an almost vaccuum pressure, i.e., "low-temperature bubble" phenomenon.

It is also proposed that a spacer, such as a film, particles, glass fiber and the like, is held between the base plates. If it is desired that the cell thickness is highly uniform, the spacer is used in a quite large amount.

However, if the spacer is used in such a large amount, the cell thickness is held too strongly for the base plates to bend. Bending generally absorbs the volume reduction for the liquid crystal at low temperatures. The amount of bending becomes too small to absorb it, however when the plates are held strongly.

It is therefore desired that the liquid crystal display panel has a uniform cell thickness and does not develop low-temperature bubble phenomenon.

SUMMARY OF THE INVENTION

It has been found that the above problems are obviated by a combination of the conventional spacer with particular polymer particles. The present invention provides a liquid crystal display panel comprising at least two base plates spaced by a sealant on the peripheral portion of the plates and liquid crystal in the space between the base plates, wherein said liquid crystal contains a spacer of rigid particles and polymer particles having 10 to 30% by weight of an epoxy group.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
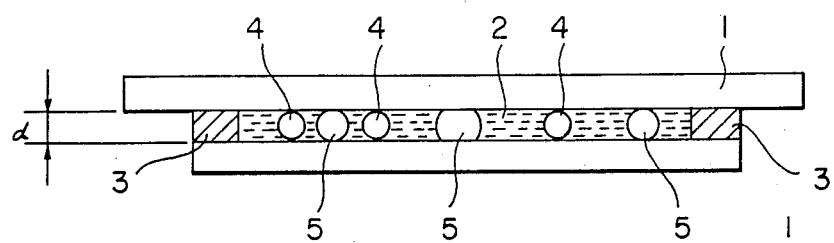
FIG. 1 schematically shows a sectional view of liquid crystal display plates of the present invention.

Two base plates 1 are spaced at a distance d, in which a liquid crystal 2 is held and sealed. The plates 1 are adhered with an adhesive agent 3. Although not shown in FIG. 1, transparent conductive film, color filters, thin film transistors and/or nonlinear elements are formed on the bases plates 1, if necessary. The base plate can be obtained from glass, plastics, and the like. The base plate 1 is subjected to an orientation treatment. The cell thickness d is generally 1 to 20 microns. The liquid crystal can be a nematic liquid crystal, a smectic A liquid crystal or a ferroelectric smectic liquid crystal.

According to the present invention, the rigid particles 4 and the polymer particles 5 are used as spacer. The rigid particles 4 are those known as a spacer, such as glass fibers, plastic particles, inorganic particles and the like. The polymer particles 5 include acrylic crosslinked particles, styrene crosslinked particles, ester crosslinked particles, urethane crosslinked particles and the like. According to the present invention, it is characterized that the polymer particles 5 contains 10 to 30% by weight, preferably 20 to 30% by weight, and more preferably 28 to 29% by weight of an unreacted epoxy group based on the total resin amount. The epoxy group may be introduced by treating the polymer particles with epihalohydrine or polyglycidyl ether, such as triglycidyl ether and the like. An epoxy-group-containing vinylmonomer, such as glycidyl (meth)acrylate, may be polymerized to form the polymer particles 5 having an epoxy group. It is believed that the epoxy groups of the polymer particles 5 reacts with an OH group, an NH group or an SH group of the orientation film or the base plate.

In order to obtain the display panel of the present invention, the rigid particles and the polymer particles are adhered onto one of the base plate. This can be done by placing the base panel in the chamber containing both particles. The base plate 1 may be treated with a liquid containing the particles and then dried. The adhesive agent 3 is then applied to the peripheral portion of the base plate to which the other base plate is pressed at an elevated temperature. The rigid particles 4 secure the minimum value of the cell thickness. The polymer particles 5 are transformed and adhered to the base plates 1 by the function of heat and pressure. The resultant empty panel is then cooled to room temperature, at which the transformed polymer particles 5 retain their forms. A liquid crystal 2 is introduced into the space formed between the plates and the plates are then sealed at the inlet to obtain a liquid crystal display panel of the present invention.

It is preferred that the polymer particles 5 of the present invention has a low elastic modulas.

EXAMPLES

The present invention is illustrated by the following Examples which, however, are not to be construed as limiting the scope of the present invention to their details.

EXAMPLE 1

Glass fiber having an average diameter of 7.5 microns and a standard deviation of diameter of 0.15 microns was cut to a length of 10 to 20 microns. One part by weight of the glass fiber and 5 parts by weight of polymer particles available from Tosoh Corporation. as Toyo Spacer (average diameter=9.0 microns, standard deviation of diameter=1 micron, epoxy content=29%) were mixed and 20 mg of the mixture was put in a clean chamber of 100 liter to form aerosol. A glass plate having a thickness of 1 mm was put in the aerosol for 5 seconds to adhere the spacer mixture on the panel. Another glass plate was screen-printed with an epoxy adhesive agent to form a seal pattern and contacted with the spacered glass plate. It was heated to 120° C. for 2 hours under pressure of 1 Kg/cm$^2$ to cure the adhesive agent and simultaneously contact the polymer particles with the glass plate. The obtained panel not containing liquid crystal has a thickness of 7.58±0.06 microns. Nematic liquid crystal was introduced into the cell by a vacuum method and sealed with a ultraviolet-curing adhesive agent to obtain a liquid crystal panel. The panel was allowed to stand at −30° C. for one hour, but no low temperature bubbles were seen.

EXAMPLE 2

One part by weight of plastic powder having an average diameter of 7 microns and a standard deviation of diameter of 0.3 microns and 5 parts by weight of polymer particles available as Toyo Spacer (average diameter=9.0 microns, standard deviation of diameter=1 micron, epoxy content=29%) were mixed and 20 mg of the mixture was put in a clean chamber of 100 liter to form aerosol. A glass plate having a thickness of 1 mm was put in the aerosol for 5 seconds to place the spacer mixture on the panel. Another glass plate was screen-printed with an epoxy adhesive agent to form a seal pattern and contacted with the spacered glass plate. It was heated to 120° C. for 2 hours under pressure 1 Kg/cm$^2$ to cure the adhesive agent and simultaneously contact the polymer particles with the glass plate. The obtained panel not containing liquid crystal has a thickness of 7.32±0.08 microns. Nematic liquid crystal was introduced into the cell by a vacuum method and sealed with a ultraviolet-curing adhesive agent to obtain a liquid crystal plate. The plate was allowed to stand at −30° C. for one hour, but no low temperature bubbles were seen.

EXAMPLE 3

One part by weight of silicon dioxide particles having an average diameter of 2.2 microns and a standard deviation of diameter of 0.15 microns and 5 parts by weight of polymer particles available from Tosoh Corporation as Toyo Spacer (average diameter=3.5 microns, standard deviation of diameter=0.2 micron, epoxy content=29 %) were mixed and 20 mg of the mixture was put in a clean chamber of 100 liter to form aerosol. A glass plate having a thickness of 1 mm was put in the aerosol for 5 seconds to place the spacer mixture on the plate. Another glass plate was screen-printed with an epoxy adhesive agent to form a seal pattern and contacted with the spacered glass plate. It was heated to 120° C. for 2 hours under pressure of 1 Kg/cm$^2$ to cure the adhesive agent and simultaneously contact the polymer particles with the glass plate. The obtained panel not containing liquid crystal has a thickness of 2.28±0.02 microns. Ferroelectric smectic liquid crystal was poured into the panel by a vacuum method and sealed with a ultraviolet-curing adhesive agent to obtain a liquid crystal panel. The panel was allowed to stand at −30° C. for one hour, but no low temperature bubbles were seen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display panel comprising at least two base plates spaced by a sealant on the peripheral portion of the plates and liquid crystal in the space between the base plates, wherein said liquid crystal contains as a spacer rigid particles and polymer particles having 10 to 30% by weight of an epoxy group.

2. The liquid crystal display panel according to claim 1 wherein said rigid particles are one of glass fiber, plastic particles and inorganic particles.

3. The liquid crystal display panel according to claim 1 wherein said polymer particles are acrylic polymer particles which are treated with polyglycidyl ether.

4. The liquid crystal display panel according to claim 1 wherein said polymer particles are prepared by polymerizing an epoxy group-containing vinyl monomer.

5. The liquid crystal display panel according to claim 1 wherein said base plates have a film formed thereon and wherein said epoxy groups of the polymer particles react with the film and base plates to chemically bond thereto.

6. The liquid crystal display panel according to claim 1 wherein said polymer particles are selected from the group consisting of acrylic crosslinked particles, styrene crosslinked particles, ester crosslinked particles, and urethane crosslinked particles.

7. The liquid crystal display panel according to claim 1 wherein the epoxy group is introduced by treating the polymer particles with epihalohydrine or polyglycidyl ether.

8. The liquid crystal display panel according to claim 1 wherein the polymer particles contain 20 to 30% by weight of an epoxy group.

9. The liquid crystal display panel according to claim 1 wherein the polymer particles contain 28 to 29% by weight of an epoxy group.

* * * * *